United States Patent [19]
Zlotek

[11] Patent Number: 4,962,385
[45] Date of Patent: Oct. 9, 1990

[54] EXPOSURE CONTROLLED IMAGING SYSTEM

[75] Inventor: David A. Zlotek, Nashua, N.H.

[73] Assignee: Cirrus Technology Inc., Nashua, N.H.

[21] Appl. No.: 306,847

[22] Filed: Feb. 7, 1989

[51] Int. Cl.$^5$ ............... G01D 9/00; G01D 15/14; H04N 1/21

[52] U.S. Cl. .................. 346/1.1; 346/108; 358/296

[58] Field of Search ........... 346/108, 107 R, 76 L, 346/160, 1.1; 358/296, 300, 302, 75, 76

[56] References Cited

U.S. PATENT DOCUMENTS 4,561,016 12/1985 Jung et al. ................. 358/76

Primary Examiner—Mark J. Reinhart
Attorney, Agent, or Firm—E. T. Barrett

[57] ABSTRACT

A digital data imaging system in which the duration of each exposure pulse of a laser beam is directly locked to the speed of movement of the film. Thus the area of the film exposed during each pixel is independent of the speed of rotation of the drum. If the drum speed decreases, the exposure time is automatically increased. The rotating drum is provided with a conventional rotary encoder that produces a fixed number of signal pulses per revolution. These primary pulses are multiplied by conventional phase-locked loop technology to produce a large number of clock pulses. The duration of each clock pulse represents a fixed increment of movement of the surface of the drum that is independent of the rotational speed of the drum. These clock pulses control the timing and on-off ratio of the laser exposure pulses. By locking the timing of the laser beam exposures (equivalent to the shutter speeds in a camera) to the rotary encoder, even slight variations in the drum speed, whether caused by system factors or operator induced, appropriately change the pixel timing.

7 Claims, 4 Drawing Sheets

EXPOSURE CONTROLLED IMAGING SYSTEM

BACKGROUND OF THE INVENTION

1. Field of the Invention

This invention relates to digital imaging systems in which moving photographic film is exposed to a focused light beam. More particularly, it relates to such a system having a control mechanism to insure uniform film exposure independent of the rate of movement of the film relative to the focused light beam.

2. Description of the Related Art

In many digital imaging systems, the film is wrapped around a rotary drum. The light beam is either a conventional light beam or a laser beam The light beam is intermittent with an intensity that is modulated in accordance with the information to be represented by the image. The image is formed of small rectangular spots, called "pixels". During the exposure of each pixel, the beam is turned on and off with a predetermined ratio of on-time to off-time Such systems have the disadvantage of being susceptible to any variations in the rotational speed of the drum. Variation in the speed of the drum, changes the ratio of the on-time to the off-time relative to the movement of the film during that period and detracts from the quality of the overall image. Problems also result from variations in the "firing" of the laser beam relative to the speed of the drum resulting in improperly spaced pixels. The usual method employed to treat this problem (either with or without a phased-locked loop) is to utilize each pulse from a rotary encoder operated by the drum to initiate an open-loop timing signal that "fires" the laser beam to expose the film on a pixel by pixel basis. Such a system insures the proper number of exposures for each drum revolution irrespective of changes in the drum speed, but variations in the exposure ratio relative to the drum speed may cause overlapping or separated pixels.

SUMMARY OF THE INVENTION

In the present invention, the duration of each exposure pulse of a laser beam is directly locked to the speed of movement of the film. Thus the area of the film exposed during each pixel is independent of the speed of rotation of the drum. If the drum speed decreases, the exposure time is automatically increased The rotating drum is provided with a conventional rotary encoder that produces a fixed number of signal pulses per revolution. These primary pulses are multiplied by conventional phase-locked loop technology to produce a large number of clock pulses. The duration of each clock pulse represents a fixed increment of movement of the surface of the drum that is independent of the rotational speed of the drum. These clock pulses control the timing and on-off ratio of the laser exposure pulses. By locking the timing of the laser beam exposures (equivalent to the shutter speeds in a camera) to the rotary encoder, even slight variations in the drum speed, whether caused by system factors or operator induced, appropriately change the pixel timing.

DESCRIPTION OF THE PREFERRED EMBODIMENTS

Figure 1:
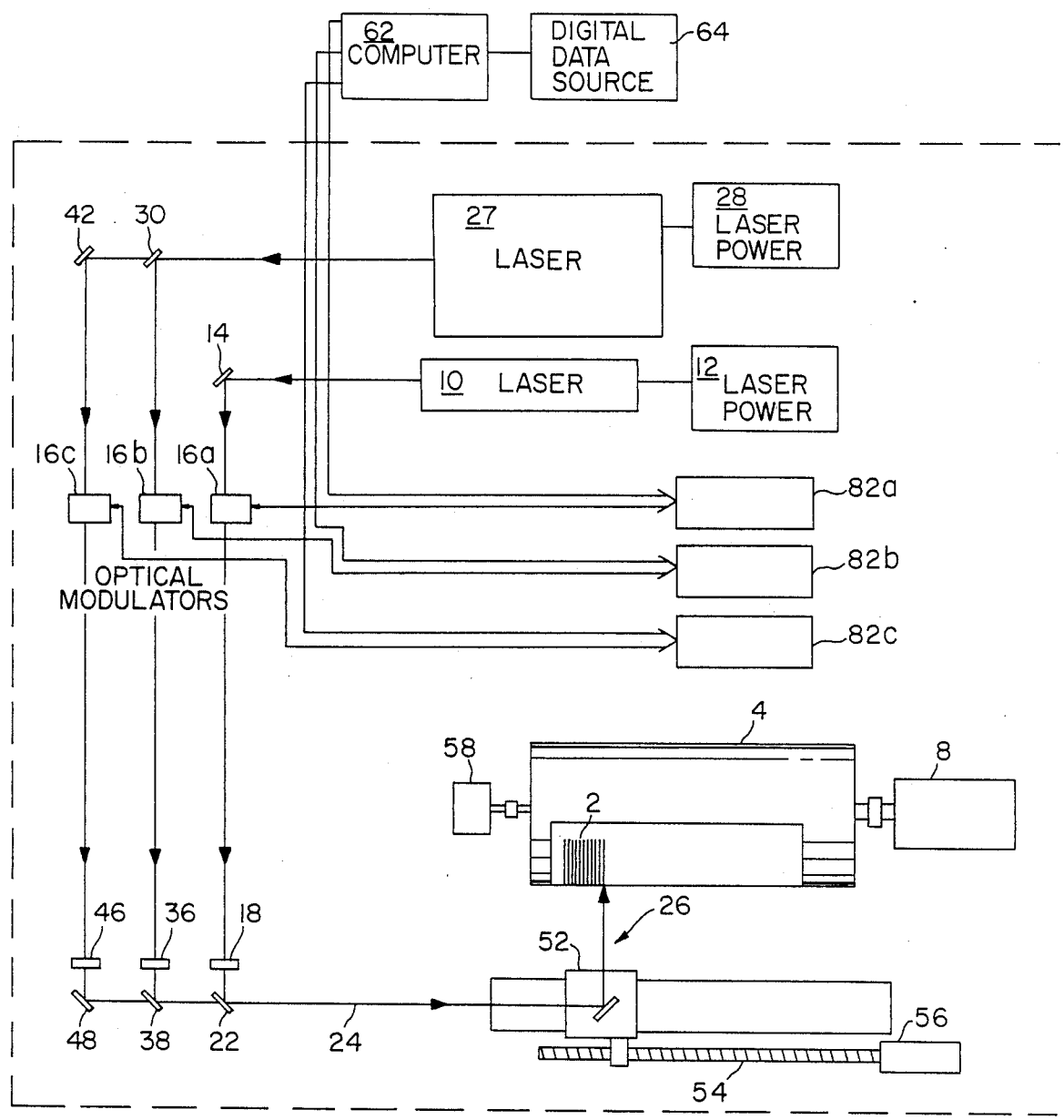
FIG. 1 is a diagrammatic representation of the overall imaging system.

The imaging system described here, except for the control circuits that are the subject of this invention, is similar to one described in co-pending application Ser. No. 07/252.670 filed Oct. 3, 1988 and assigned to the same assignee as the present application. As shown in FIG. 1, a sheet of photographic film 2 is mounted on a rotatable drum 4. The drum is driven by a dc electric motor 8. This drive system is the same as those conventionally used in such imaging systems.

In this example, a three color system is illustrated, but the control circuits described here are equally applicable to single color systems The red wavelengths of the exposure beam are derived from a CW laser 10, operated from a power unit 12. This light is reflected by a mirror 14 into and through an optical modulator 16a and through a mask 18 onto a dichroic mirror 22 that reflects the red wavelengths into a main beam 24 that is, in turn, reflected by a mirror and aperture assembly, generally indicated at 26, onto the film 2.

The other two color components, blue and green are provided from a single laser 27, driven from a power unit 28. The emission from the laser 27 is separated into two separate color bands by a dichroic mirror 30 that reflects the blue wavelengths into and through an optical modulator 16b, through the opening in a mask 36 onto a dichroic mirror 38. The mirror 38 reflects the blue light through the mirror 22 into the coincident final beam path 24.

The green wavelengths are reflected by a mirror 42 through an optical modulator 16c and a mask 46 onto a mirror 48 by which they are reflected through the mirrors 38 and 22 into the beam path 24.

The mirror and aperture assembly 26 is mounted on an optical carriage, diagrammatically illustrated at 52, which is driven horizontally parallel with the length of the drum 4 by a lead screw 54 and a stepping motor 56.

The operation of the optical modulators 16a, 16b and 16c is controlled from a computer 62 that derives the digital data from a source 64. As will be described later, the optical modulators 16a, 16b and 16c are respectively turned on and off by three pixel exposure control circuits 82a, 82b and 82c.

Because the image is made up of a number of individual pixels, the laser beam that exposes the film is not continuously on, but rather is divided into individual pulses separated by periods during which the beam is turned off. The ratio of on-time to off-time is determined empirically to produce the best image on the particular film or other media. In this example a ratio of 40 percent on/60 percent off provides satisfactory results.

A rotary encoder 58, which may be of conventional construction, is mechanically coupled to the drum 4 and provides a series of electrical pulses corresponding to the angular position of the drum. In this example, the encoder 58 delivers 1250 pulses per revolution each representing a constant finite increment of movement of the drum 4. A phase-locked loop circuit 66 (FIG. 3) multiplies the pulses to 425,800 pulses per revolution. With the system dimensions used here, the period of time between the leading edges of successive pulses corresponds to a surface circumferential movement of the drum of 0.5 micron.

Figure 2:
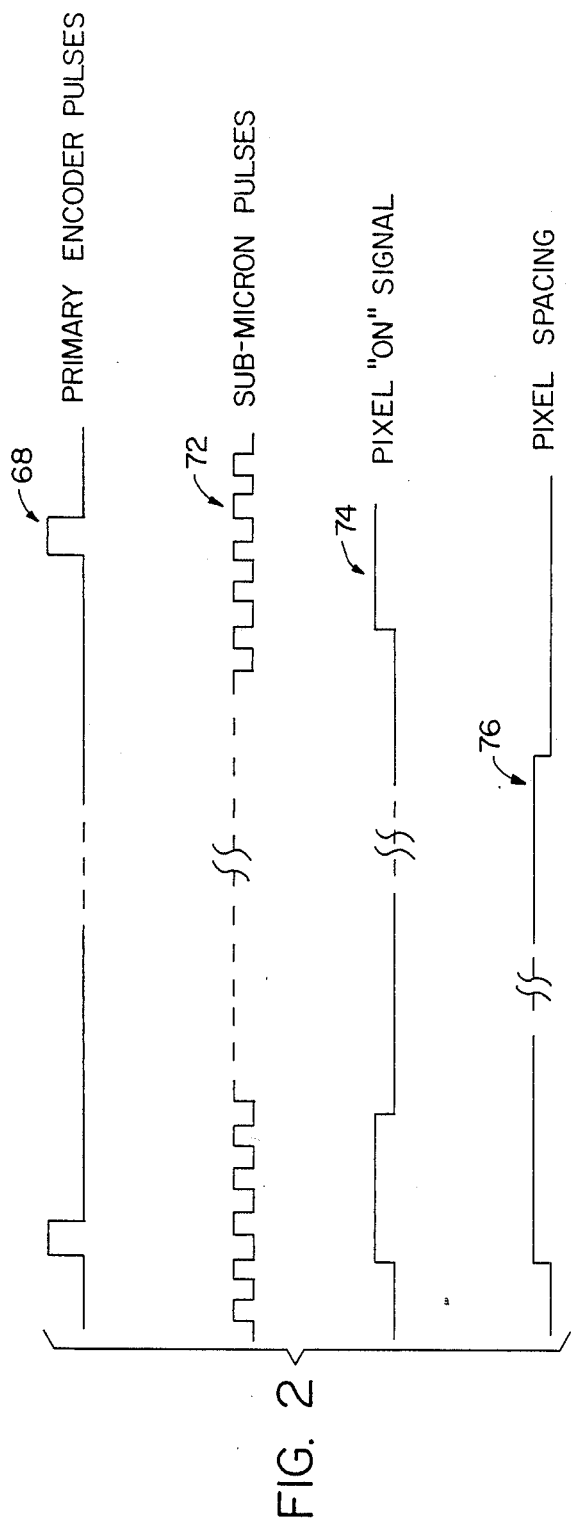
FIG. 2 is a diagrammatic representation to illustrate the relationship between various control signals.

In FIG. 2, the primary pulses from the encoder 58 are represented at 68. There are 1250 of these per revolution. After multiplication by the phase-locked loop 66, the 0.5 micron electronic clock pulses are generated as represented at 72.

Each pixel on the image is equal in dimensions to the illumination aperture of the exposure system. In this imaging device, apertures of various sizes may be selected by the operator For example, aperture sizes of 20, 25, 28.5, 30, 40, 50, 57 and 60 microns may be available to the operator. Each of these aperture squares can be constructed from the 0.5 micron clock pulses. That is, the exposure is controlled by counting the number of 0.5 micron pulses. Two separate signals are generated from the control pulses: a first signal turns on the laser beam after the elapse of a first predetermined number of control pulses; and a second signal turns off the laser beam after the elapse of a second predetermined number of control pulses.

The pulses 74 represent the periods when the film is being exposed and the pulses 76 represent the entire period of one pixel.

If, for example, a square pixel measuring 30 microns on each side is desired, the operative dimension corresponds to 60 of the 0.5 micron pulses. To provide the desired 40 percent on and 60 percent off timing ratio, the 0.5 micron clock pulses are counted. When 36 pulses have been counted, the laser beam is turned on and allowed to expose the film for the next 24 pulses at which time the laser beam is switched off. It is not necessary that the period of exposure occur at any particular time during the pixel. For example, with a 30 micron pixel, the laser beam may be switched on at the beginning of the pixel and turned off for the remaining 36 clock pulses. Or the beam may be switched on at any present point during the pixel so long as there is time for the exposure to be completed during the pixel.

Figure 3:
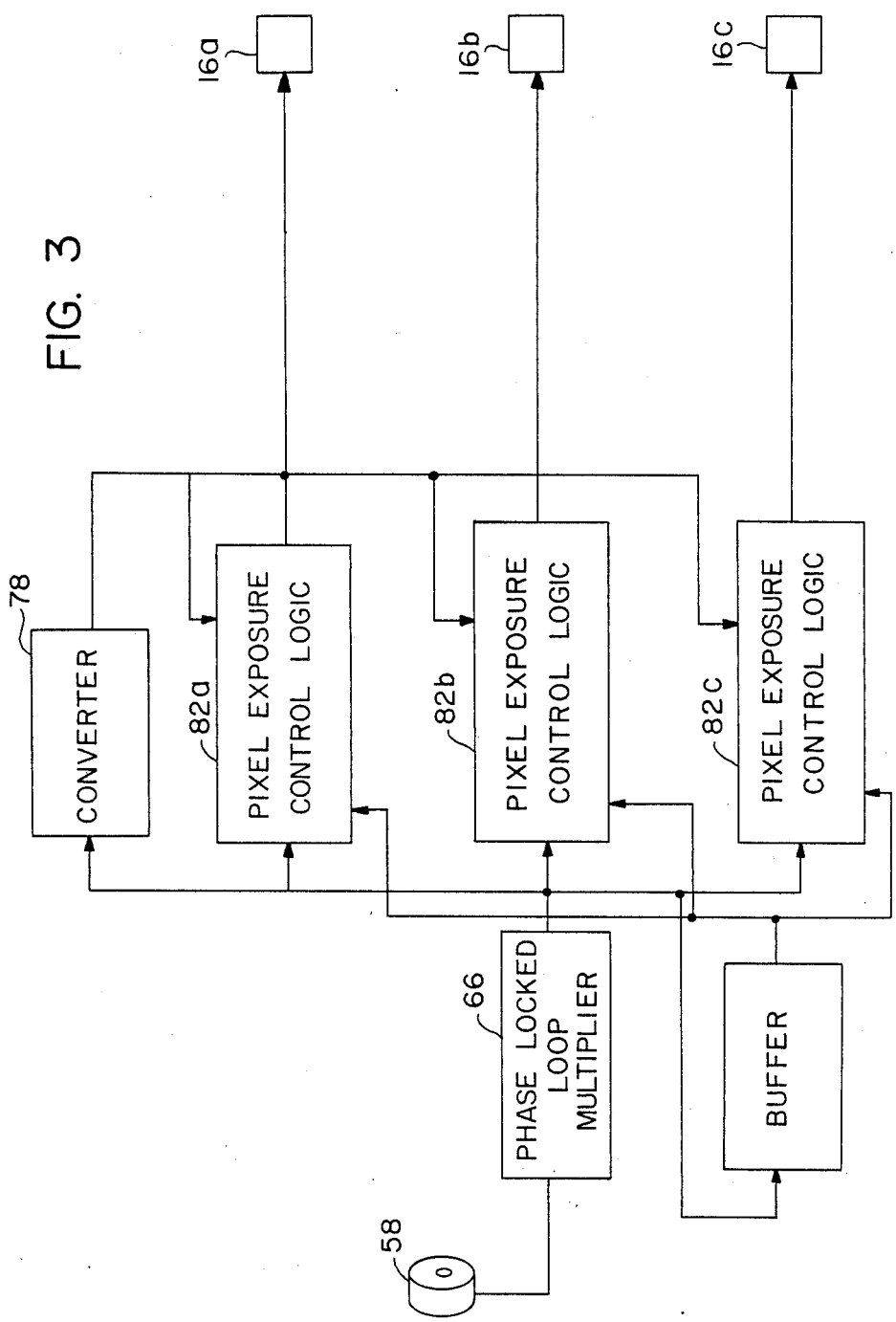
FIG. 3 is a block diagram of the overall exposure control system.

As shown in FIG. 3, the clock pulses from the multiplier 66 are fed into three identical pixel exposure control logic circuits 82a, 82b and 82c. The clock pulses are also fed into a converter 78 that counts the number of 0.5 micron clock pulses to make an entire pixel. The converter 78 generates one pulse for each pixel which is also fed into the three control circuits 82a, 82b and 82c.

Within the pixel exposure control circuits, 82a for example, a digital counter is pre-set to a particular number representing, in this example, 40% of the total number of clock pulses that represent the aperture dimensions (the aperture has the same dimensions as a pixel on the exposed film). If the aperture is 28.5 microns, the total number of clock pulses is 57. The on-time of 40% is represented by 23 clock pulses. This number is used to pre-set the digital counter in the control logic 82a.

The pixel exposure timing signal from the converter 78 begins the exposure timing cycle. The pixel exposure is ended with the terminal count signal. For example, assuming a 40% on-time ratio and a 28.5 micron aperture, the exposure initiated by the pulse from the converter 78 will remain on for 23 clock pulses. By this means, for a given aperture size, the on/off ratio has been preset to 40% on/60% off.

The pixel exposure control logic circuit 82a generates a control signal that is fed into the modulator 16a. So long as this pulse is on, the modulator 16a is actuated to expose the film with an intensity that is a function of the digital data that is also being fed into the modulator.

The modulator 16b is switched on and off by the pixel exposure control logic circuit 82b, and the modulator 16c is switched by the exposure control logic circuit 82c. It would be possible to control all of the modulators 16 from a single pixel exposure control logic circuit, but the use of three independent control circuits has the advantage that the on-off exposure ratio can be established at a different ratio for each of the primary colors. For example, the red modulator might be set for a ratio of 45% on/55% off; the blue might be 40% on/60% off; and the green might be 35% on/65% off.

Figure 4:
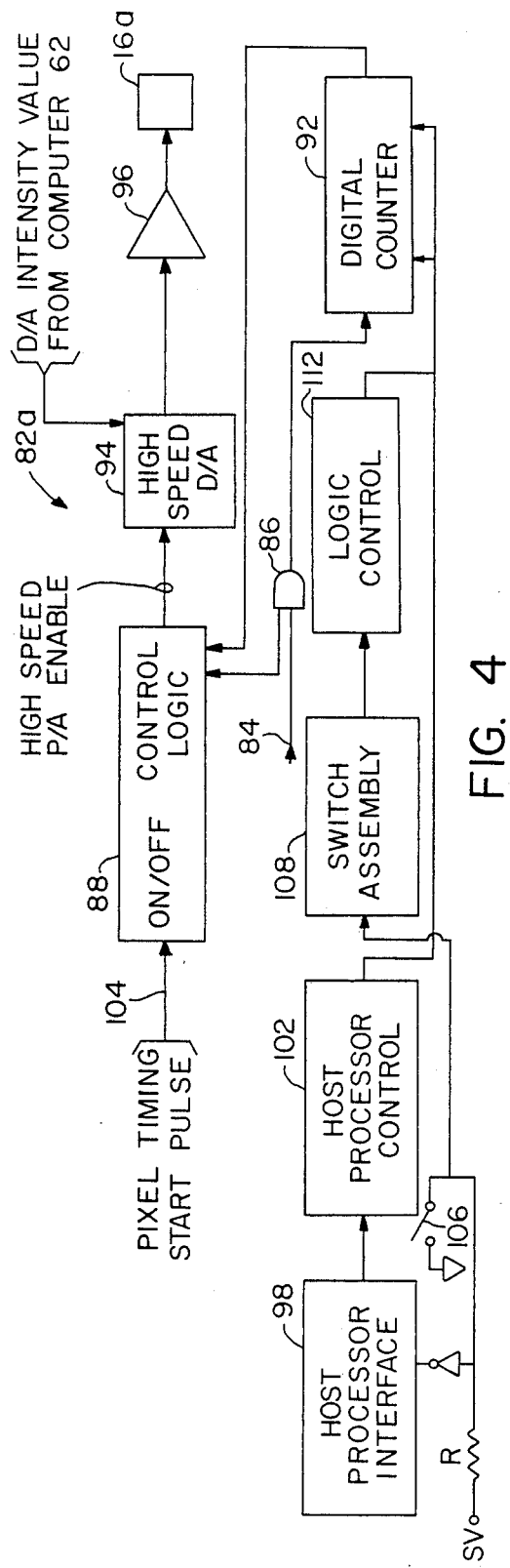
FIG. 4 is a block diagram of the major components of the pixel exposure control logic.

As shown in FIG. 4, in the pixel exposure control logic circuit, the high frequency clock pulses from the phase-locked loop multiplier 66 are applied to input terminal 84 and connected through an and-gate 86 which controls digital counter 92. A high speed digital-analog converter is enabled and disenabled by the control logic circuitry 88. This analog signal is amplified by an amplifier 96 and applied to the modulator 16a.

The on-off exposure ratio, when under computer control, is determined by a host processor interface circuit 98 whose output signal is fed through a host processor control 102 to the digital counter 92. Thus if the computer control is present for a 40% on/60% off ratio, the digital counter will be set to count the appropriate number of clock pulses to establish the exposure.

The start of each pixel is controlled by a start mark generated by the converter 78 (FIG. 3) and applied through terminal 104 to the on/off control logic circuit 88 (FIG. 4). The stop signal to terminate the exposure is generated by the digital counter 92, which drives the on/off control logic circuit 88.

If it is desired to adjust the on/off exposure ratio manually under the control of the operator, a switch 106 is closed connecting an enabling circuit to ground. With the switch 106 closed, the host processor interface 98 is deactivated and a switch assembly 108 is turned on. The signal from the switch assembly is fed through a local control circuit 112 to the digital counter 92. The switch assembly 108 and the control circuits 112 permit the operator to establish a desired on/off exposure ratio.

Each of the pixel exposure control logic circuits 82b and 82c are identical with pixel exposure control logic circuit 82a as described in connection with FIG. 4.

The firing of the laser beam is strictly controlled as a function of the speed of the film relative to the laser beam and the exposure time is maintained with the desired on-off ratio independently of variations in the speed of the movement of the film.

The exposure system described results in pixels that are perfectly spaced around the drum without any tendency for one pixel to "bleed" into another. Such accurate control of the exposure has the added benefit of accurately controlling the placement along the y axis.

Although this embodiment has been described in connection with a rotating drum for holding the film, it can also be applied to systems in which the film is propelled by some different mechanism.

The control system described here is also applicable to rotating polygon systems in which the film is stationary on a flat or arcuate surface while the exposure beam is deflected onto the screen by a rotating mirror on a polygon surface. The rotating mirror is driven across the film by a lead screw. In this case, the encoder is driven by the same mechanism that rotates the mirror and the same circuitry described above controls the exposure timing to accomplish the same results and with the same benefits as those described herein.

I claim:

1. In a system for producing photographic images from digital data wherein photographic film is exposed to an intermittent pulses of a beam of focused light, each of which produces a single pixel, and wherein there is relative motion between said film and said beam, the combination comprising means for producing a series of electrical pulses having a repetition rate bearing a direct relationship to the rate of movement of said film relative to said beam, whereby the interval between successive pulses corresponds to a predetermined increment of relative movement between said film and said beam, an aperture intercepting said beam, means focusing said beam to project an outline of one pixel on said film, the dimensions of said pixel bearing a predetermined fixed relationship to the dimensions of said aperture, digital counter means for counting said pulses, and means under the control of said digital counter means for turning said beam on and off in accordance with a predetermined relationship between the ratio of the time the beam is turned on to the time it is turned off, whereby the length of time said beam is turned on varies as a function of the velocity of said film relative to said beam at the point of impingement while said ratio remains constant.

2. The combination as claimed in claim 1 including a revolving drum on which said film is mounted.

3. The combination as claimed in claim 2 including an encoder operated by said drum, and wherein said means for producing a series of pulses includes means for multiplying the repetition rate of pulses produced by said encoder.

4. The combination as claimed in claim 1 wherein said means for turning said beam on and off comprises an optical modulator.

5. In a system for producing color photographic images from digital data wherein photographic film is moved relative to and exposed by an intermittent beam of focused light, each successive on period and off period combining to produce a single pixel, the combination comprising means for producing first, second and third laser beams of differing color content, means for combining said laser beams into a final exposure beam, means focusing said exposure beam to impinge on said film, means for producing a series of pulses having a repetition rate bearing a direct relationship to the rate of movement of said film relative to said exposure beam, whereby the interval between successive pulses corresponds to a predetermined increment of relative movement between said film and said exposure beam, first, second and third digital counter means for counting said pulses, and first, second and third optical modulator means under the control, respectively, of said first, second and third digital counter means for turning said first, second and third beams on and off in accordance with a predetermined ratio of the time each of said first, second and third beams are turned on to the time they are it is turned off, whereby the length of time each of said beams is turned on varies as a function of the velocity of said film relative to said exposure beam at the point of impingement while said ratio remains constant.

6. The combination as claimed in claim 5 including a rotating drum carrying said film, and wherein said means for producing a series of pulses includes an encoder operated by said drum, and means for multiplying the repetition rate of pulses produced by said encoder 7. In a digital imaging system, the method comprising the steps of producing a focused beam, exposing photographic film having relative motion with respect to said beam, generating a series of electrical pulses having a repetition rate bearing a direct relationship to the relative speed of movement between said film and said beam whereby the interval between said pulses represents a specific increment of relative movement between said film and said beam, turning said beam successively on and off in accordance with a pre-established ratio of on-time to off-time, and controlling the on time of said beam as function of the repetition rate of said pulses.

* * * * *